Jan. 17, 1928.

J. P. ANTHONY

PORTABLE SAW RIG

Filed May 14, 1927  2 Sheets-Sheet 1

1,656,311

Inventor
J. P. Anthony
By Watson E. Coleman
Attorney

Jan. 17, 1928.  
J. P. ANTHONY  
PORTABLE SAW RIG  
Filed May 14, 1927  
1,656,311  
2 Sheets-Sheet 2
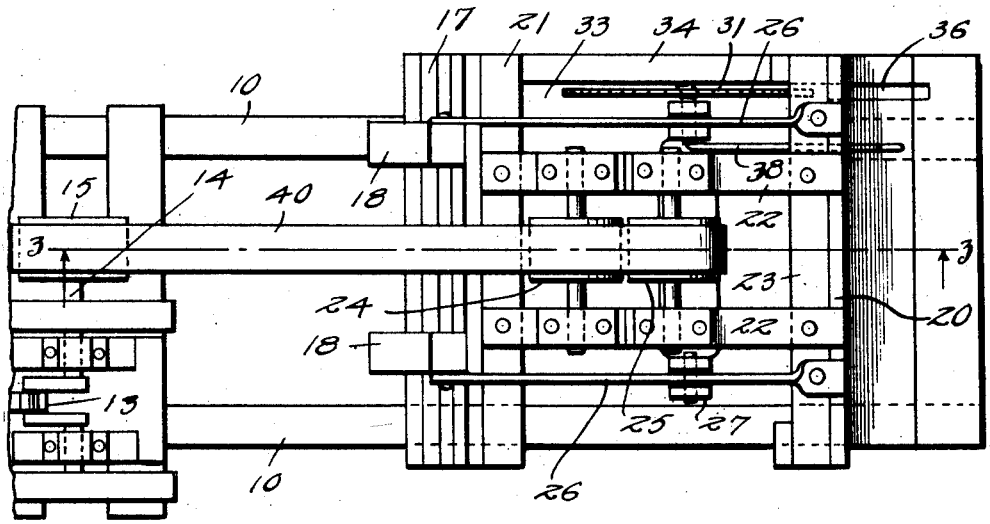
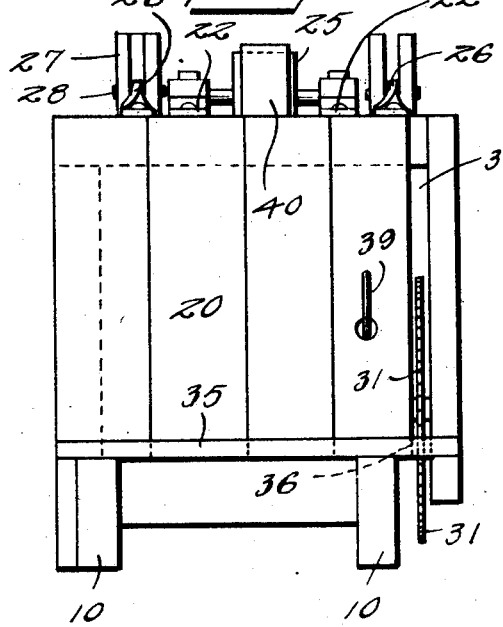
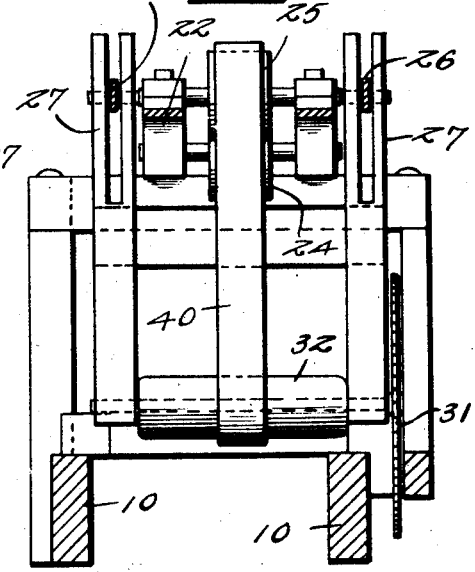
Inventor  
J. P. Anthony  
By Watson E. Coleman  
Attorney Patented Jan. 17, 1928.

1,656,311

UNITED STATES PATENT OFFICE.

JAMES P. ANTHONY, OF COLUMBIA, MISSOURI.

PORTABLE SAW RIG.

Application filed May 14, 1927. Serial No. 191,406.

This invention relates to sawing machines, and particularly to portable sawing machines for the purpose of sawing firewood and for other like work.

One of the objects of the present invention is to provide a very simple, strong and effective machine of this character wherein the saw is adapted to be driven by a motor mounted upon the saw supporting frame and to be shifted by hand into or out of engagement with the log to be sawed.

A further object is to provide improved means for transmitting power from the engine to the saw which includes an endless belt and swinging supports for the saw arbor and pulley thereof so that as the saw is pulled over toward the work and into the work, the driving belt will tighten so as to prevent the saw from slipping.

Another object is to provide means which will absolutely prevent the workman from being cut by the saw and will normally house the saw.

My invention will be illustrated in the accompanying drawings, wherein:—

Figure 2 is a top plan view thereof;

Figure 4 is a rear elevation;

Figure 5 is a section on the line 5—5 of Figure 1.

Figure 1:
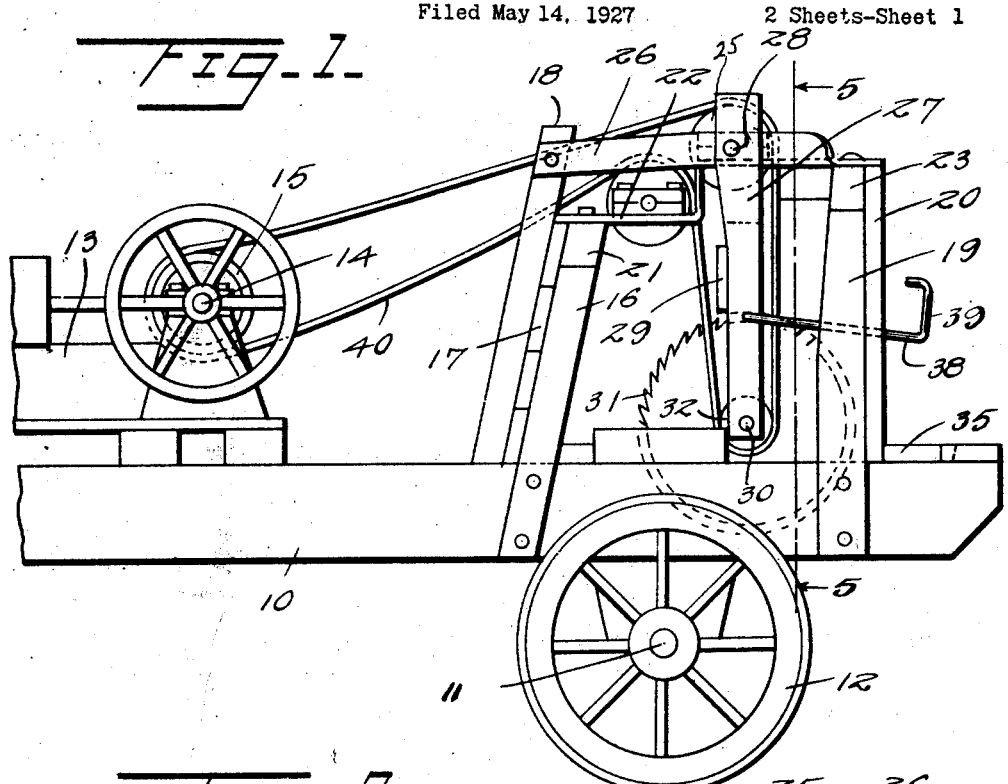
Figure 1 is a side elevation of my improved sawing rig.

Referring to these drawings, 10 designates the sills of the supporting base frame of the mechanism which is mounted upon the rear axle 11 carrying the wheels 12. Front wheels are, of course, provided but are not illustrated, as these will be obvious. Mounted upon the sills 10 is the motor, designated generally 13, which may be of any suitable character. The motor includes the transverse shaft 14 driven from the motor and carrying the pulley 15.

Figure 3:
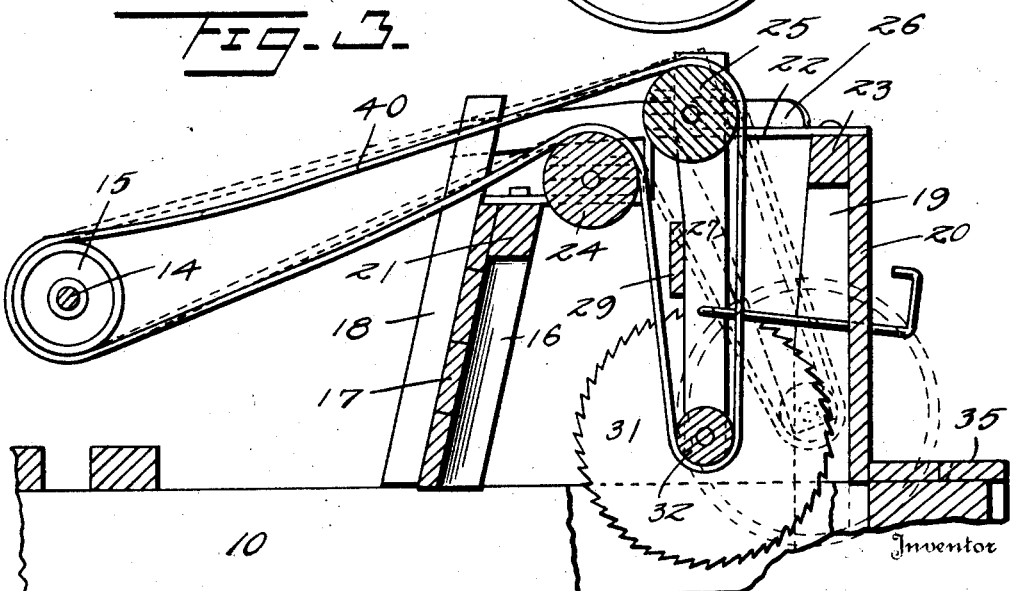
Figure 3 is a longitudinal sectional view thereof.

Mounted at the rear end of the frame 10 are the upstanding beams 16, preferably supporting a transverse wall 17. Mounted in front of said wall are the uprights 18 and adjacent the rear end of the sills there is provided the uprights 19 supporting the transverse wall 20. Attached to the upper face of a cross beam 21 carried by the uprights 16 are the supporting irons 22. These extend rearward from the cross beam 21, then upward, and then again rearward and are attached to a transverse beam 23 mounted upon the uprights 19, as shown in Figure 3. These irons support bearings for a pulley 24 and the bearings for a pulley 25 which is disposed above and in advance of the pulley 24. Longitudinally extending irons 26 are attached to the uprights 18 and to the cross beam 23, and pivotally supported upon these irons 26 are the depending, freely swinging arms or hangers 27. These are pivoted upon the irons 26 at 28, and it will be seen that these pivots are preferably in line with the rotative axis of the pulley 25. The hangers 27 are connected by a cross beam or member 29, and the lower ends of the hangers support the transversely extending saw arbor 30. This saw arbor carries upon it the saw 31 and also carries the pulley 32. The saw arbor is disposed to operate within a space 33 formed between the adjacent sill beam and the longitudinal beam 34. This beam 34 extends back beneath the platform 35 which is mounted upon the rear ends of the sills. This platform, as shown in Figure 2, is slotted at 36 to accommodate the saw and the rear wall 20 is formed with a slot 37 for the same purpose.

Pivotally engaged with one of the hangers is an operating rod 38 which extends out through an opening in the wall 20 and is provided with a handle 39. By pulling upon this rod, the hangers may be shifted to shift the saw outward through the slots 37 and 36 and against the work which is supported upon the platform 35 and against the wall 20.

Passing over the pulley 15 and over the pulleys 24, 25 and 30 and over the pulley 32 is the endless belt 40. It will be seen that when the saw is not in use, the hangers 27 will hang straight downward and the saw will be withdrawn in the housing formed by the wall 20. When it is desired to use the saw, a billet of wood is placed upon the platform 35 and the handle 39 is pulled, drawing the saw outward. As the saw is pulled outward it will bite into the wood and be fed through the wood by a pull upon the handle 39. It will be seen that pulling the hangers 27 rearward places a strain upon the belt, which acts to tighten the belt so that as the saw feeds into the wood the belt will be tight enough so as to prevent any slippage of the belt due to the resistance offered by the work to the saw. It will be seen that there is no slack in the belt when the saw is pulled into the wood as one pulley takes up the slack so that the belt stays at the same tension.

This rig is particularly safe from chance of accident, as the saw is never out beyond the housing wall 20 unless pulled out. In practice it has been found to be an extremely fast cutting rig. In this rig the saw is pulled against or into the work instead of setting the work, that is the billets of wood being shoved toward the saw. The saw under these circumstances never cramps but runs clear all the time and does not get hot. There is direct drive from the engine to the saw. Saws from twenty-four to thirty-eight inches with safety.

It is obvious that many modifications might be made without departing from the spirit of the invention as defined in the appended claims.

I claim:—

1. A saw rig including a wheel-supported main frame carrying a motor, a supporting frame mounted upon the main frame, a pair of hangers pivotally mounted upon the main frame and depending therefrom, a saw arbor carried by the lower ends of the hangers and having a saw thereon, a pulley mounted upon the supporting frame with its axis adjacent to the pivotal axis of the hangers, a pulley mounted in front of and below the first named pulley, a motor-driven pulley, a belt passing around the motor-driven pulley and the pulley on the saw arbor and over the second and third named pulleys, the rear end of the saw supporting frame having a work platform, a wall extending upward immediately forward of the work platform and having a slot through which the saw may be projected, and means connected to the hangers whereby the hangers may be shifted rearward to project the saw through said slot.

2. A saw rig of the character described including longitudinal wheel-supported sills, an upwardly extending wall mounted adjacent the rear end of the sills, an upwardly projecting wall forward of the first named wall, irons attached to the last named wall and extending horizontally therefrom, then vertically and then horizontally to the first named wall, pulley shaft bearings mounted upon the horizontal portions of said irons, pulley shafts mounted in said bearings and carrying pulleys, the rearmost pulley being above and in advance of the first named pulley, uprights mounted forward of the forward wall, irons extending from said uprights to the forward wall exteriorly of the first named irons, hangers pivotally connected to the last named irons at a point slightly in advance of the axis of the forward pulley, a saw arbor carried by the hangers and carrying a saw on one end and a pulley, the forward wall and platform being slotted to receive said saw, a rod connected to one hanger and extending out through the said wall and provided with a handle whereby the hangers may be shifted to advance the saw into the work, a motor mounted upon the sills and having a band wheel, and an endless belt passing over said band wheel, over the first and second named pulleys, and around the pulley on the saw arbor.

In testimony whereof I hereunto affix my signature.

JAMES P. ANTHONY.